(12) United States Patent
Roig et al.

(10) Patent No.: US 12,455,113 B2
(45) Date of Patent: Oct. 28, 2025

(54) DEVICE AND METHOD FOR REFRIGERATING OR LIQUEFYING A FLUID

(71) Applicant: L'Air Liquide, Societe Anonyme pour l'Etude et l'Exploitation des Procedes Georges Claude, Paris (FR)

(72) Inventors: Mathieu Roig, Sassenage (FR); Remi Nicolas, Sassenage (FR); Fabien Durand, Sassenage (FR); Guillaume Delautre, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 257 days.

(21) Appl. No.: 18/276,828

(22) PCT Filed: Jan. 18, 2022

(86) PCT No.: PCT/EP2022/050977
§ 371 (c)(1),
(2) Date: Aug. 10, 2023

(87) PCT Pub. No.: WO2022/171394
PCT Pub. Date: Aug. 18, 2022

(65) Prior Publication Data
US 2024/0125545 A1    Apr. 18, 2024

(30) Foreign Application Priority Data
Feb. 10, 2021 (FR) ................. FR 2101244

(51) Int. Cl.
*F25B 9/10* (2006.01)
*F25B 31/02* (2006.01)
(Continued)

(52) U.S. Cl.
CPC ............... *F25J 1/029* (2013.01); *F25B 9/10* (2013.01); *F25B 31/026* (2013.01); *F25J 1/001* (2013.01);
(Continued)

(58) Field of Classification Search
CPC .. F25J 1/0007; F25J 1/001; F25J 1/005; F25J 1/0052; F25J 1/0062; F25J 1/0065;
(Continued)

(56) References Cited

U.S. PATENT DOCUMENTS

| | | | |
|---|---|---|---|
| 4,161,107 A | 7/1979 | Korsakov-Bogatkov et al. | |
| 4,530,744 A | 7/1985 | Smith | |

(Continued)

FOREIGN PATENT DOCUMENTS

| | | |
|---|---|---|
| EP | 2211124 A1 | 7/2010 |
| EP | 3249319 A1 | 11/2017 |

(Continued)

OTHER PUBLICATIONS

Berstad, David O. et al., Large-scale hydrogen liquefier utilising mixed-refrigerant pre-cooling, Int'l Journal of Hydrogen Energy 35 (2010) 4512-4534.

(Continued)

*Primary Examiner* — Filip Zec
(74) *Attorney, Agent, or Firm* — Justin K. Murray

(57) ABSTRACT

Disclosed is a device for refrigerating or liquefying a fluid such as natural gas or hydrogen, comprising a fluid circuit that is to be cooled and has an upstream end for connection to a source of gaseous fluid as well as a downstream end for connection to a member for collecting the cooled or liquefied fluid, the device comprising a heat exchanger assembly in heat exchange with the fluid circuit to be cooled, the device comprising a refrigerator in heat exchange with at least a portion of the exchanger assembly, the refrigerator (Continued)

being of the type that has a cycle for refrigerating a cycle gas containing at least one of: helium, hydrogen, nitrogen or neon; said refrigerator comprising in series in a cycle circuit: a mechanism for compressing the cycle gas, at least one member for cooling the cycle gas, a mechanism for expanding the cycle gas, and at least one member for reheating the expanded cycle gas, wherein the compression mechanism comprises a plurality of compression stages in series composed of a centrifugal compressor assembly, the compression stages being mounted on a set of shafts that are rotationally driven by a motor assembly, the at least one member for cooling the cycle gas comprising at least one heat exchanger at the outlet of at least one compression stage in heat exchange with the cycle circuit, said heat exchanger being cooled by a heat transfer fluid, characterized in that the compression mechanism comprises at least two compression stages that are arranged successively in series and do not include any member for cooling the cycle gas such as a heat exchanger therebetween.

13 Claims, 1 Drawing Sheet

(51) Int. Cl.
*F25J 1/00* (2006.01)
*F25J 1/02* (2006.01)
*F25B 25/00* (2006.01)

(52) U.S. Cl.
CPC ............ *F25J 1/0022* (2013.01); *F25J 1/005* (2013.01); *F25J 1/0065* (2013.01); *F25J 1/0067* (2013.01); *F25J 1/0072* (2013.01); *F25J 1/0097* (2013.01); *F25J 1/0235* (2013.01); *F25J 1/0254* (2013.01); *F25J 1/0279* (2013.01); *F25J 1/0284* (2013.01); *F25J 1/0289* (2013.01); *F25J 1/0296* (2013.01); *F25J 1/0298* (2013.01); *F25B 25/005* (2013.01); *F25J 1/0062* (2013.01); *F25J 2230/04* (2013.01); *F25J 2245/02* (2013.01); *F25J 2270/14* (2013.01)

(58) Field of Classification Search
CPC ........ F25J 1/0072; F25J 1/0205; F25J 1/0214; F25J 1/0215; F25J 1/0271; F25J 1/0279; F25J 1/0284; F25J 1/0288; F25J 1/0289; F25J 1/0292; F25J 1/0298; F25J 2205/82; F25J 2230/06; F25J 2230/08; F25J 2230/20; F25J 2230/22; F25J 2230/42; F25J 2240/04; F25J 2270/16; F25J 2290/34

See application file for complete search history.

(56) References Cited

U.S. PATENT DOCUMENTS

| | | | |
|---|---|---|---|
| 5,205,134 A | 4/1993 | Gistau-Baguer | |
| 6,298,688 B1 | 10/2001 | Brostow et al. | |
| 8,464,551 B2* | 6/2013 | Roberts | F25J 1/0263 62/611 |
| 10,859,313 B2* | 12/2020 | Zhao | F25J 3/0242 |
| 10,866,022 B2* | 12/2020 | Krishnamurthy | F25J 1/005 |
| 11,635,252 B2* | 4/2023 | Liu | F25J 1/0072 62/613 |
| 2006/0225461 A1 | 10/2006 | Paradowski | |
| 2010/0135825 A1 | 6/2010 | Walth | |
| 2010/0263405 A1 | 10/2010 | Durand et al. | |
| 2014/0245780 A1* | 9/2014 | Wyllie | F25J 1/0057 62/613 |
| 2017/0167785 A1* | 6/2017 | Pierre, Jr. | F25J 1/0234 |
| 2017/0343012 A1 | 11/2017 | Augy et al. | |
| 2018/0017320 A1* | 1/2018 | Bahari | F25J 1/0055 |
| 2018/0038643 A1* | 2/2018 | Roesch | F25J 1/0037 |
| 2018/0058753 A1* | 3/2018 | Mak | F25J 1/0265 |

FOREIGN PATENT DOCUMENTS

| | | |
|---|---|---|
| EP | 3702588 A1 | 9/2020 |
| EP | 3368630 B1 | 12/2020 |
| FR | 3086707 A1 | 4/2020 |
| FR | 3098574 A1 | 1/2021 |
| JP | H02171579 A | 7/1990 |
| JP | H05203343 A | 8/1993 |
| JP | 2007205667 A | 8/2007 |
| WO | 2017013213 A1 | 1/2017 |

OTHER PUBLICATIONS

He, T. et al., Optimal synthesis of expansion liquefaction cycle for distributed-scale LNG (liquefied natural gas) plant, Energy 88 (2015) 268-280.
Quack, H. et al., Nelium, a refrigerant with high potential for the temperature range between 20 and 70 K, Physics Procedia 67 (2015) 176-182.
Saji, N. et al., Design of oil-free simple turbo type 65 K-6 helium and neon mixture gas refrigerator for high temperature superconducting power cable cooling, AIP Conference Proceedings 613 (2020), published online May 15, 2002, 893-900.
Valenti, G. et al., Proposal of an innovative, high-efficiency, large-scale hydrogen liquefier, Int'l Journal of Hydrogen Energy 33 (2008) 3116-3121.
International Search Report and Written Opinion for corresponding PCT/EP2022/050977, Apr. 20, 2022.

* cited by examiner

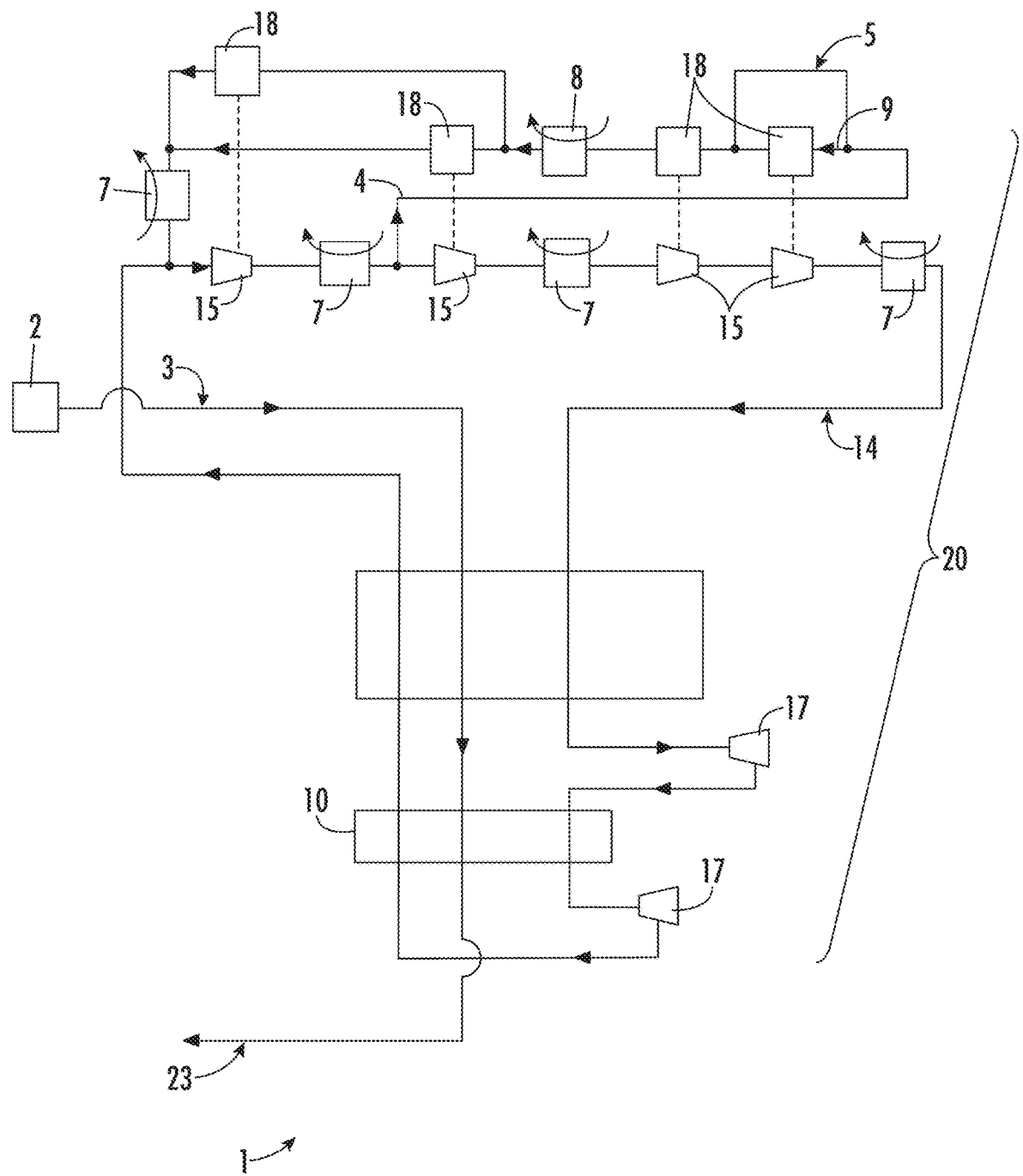

DEVICE AND METHOD FOR REFRIGERATING OR LIQUEFYING A FLUID

CROSS REFERENCE TO RELATED APPLICATIONS

This application is a § 371 of International PCT Application PCT/EP2022/050977, filed Jan. 18, 2022, which claims the benefit of FR2101244, filed Feb. 10, 2021, both of which are herein incorporated by reference in their entireties.

FIELD OF THE INVENTION

The invention relates to a device and to a method for refrigeration or liquefaction of a fluid.

BACKGROUND OF THE INVENTION

Increasing the capacity of a cryogenic refrigerator/liquefier (that is to say the refrigeration/liquefaction power supplied) generally requires significant modification of the architecture of the refrigeration cycle and the provision of additional equipment (additional compressors with coolers at the outlet).

SUMMARY OF THE INVENTION

The invention relates more particularly to a device for refrigeration or liquefaction of a fluid, such as natural gas or hydrogen, comprising a circuit for fluid that is to be cooled, having an upstream end intended to be connected to a source of gaseous fluid and a downstream end intended to be connected to a member for collecting the cooled or liquefied fluid, the device comprising an assembly of heat exchanger(s) in a heat exchange relationship with the circuit for fluid that is to be cooled, the device comprising a refrigerator in a heat exchange relationship with at least part of the assembly of heat exchanger(s), the refrigerator being of the type performing a refrigeration cycle on a cycle gas, comprising at least one of the following: helium, hydrogen, nitrogen or neon, said refrigerator comprising the following, disposed in series in a cycle circuit: a mechanism for compressing the cycle gas, at least one member for cooling the cycle gas, a mechanism for expanding the cycle gas and at least one member for heating the expanded cycle gas, wherein the compression mechanism comprises multiple compression stages in series that are composed of an assembly of compressor(s) of centrifugal type, the compression stages being mounted on a set of shafts driven in rotation by an assembly of motor(s), the at least one member for cooling the cycle gas comprising at least one heat exchanger disposed at the outlet of at least one compression stage in a heat exchange relationship with the cycle circuit, said heat exchanger being cooled by a heat transfer fluid.

One aim is to limit the complexity and the cost of such a plant without significantly affecting the overall efficiency of the system and notably of its compression system.

One aim of the present invention is to remedy all or some of the drawbacks of the prior art that are set out above.

To that end, the device according to the invention, which is otherwise in accordance with the generic definition thereof given in the above preamble, is essentially characterized in that the compression mechanism comprises at least two compression stages that are disposed successively in series and do not have a member for cooling the cycle gas such as a heat exchanger for exchanging heat between them.

Furthermore, embodiments of the invention may include one or more of the following features:
- the compression mechanism comprises four compression stages in series, the member for cooling the cycle gas comprising three cooling heat exchangers disposed respectively between the first and the second compression stage, between the second and the third compression stage, and at the outlet of the fourth compression stage,
- the device comprises cooling heat exchangers that are disposed solely every two compression stages in series,
- the assembly of motor(s) comprises multiple motors for driving the compression stages,
- the assembly of motor(s) comprises a separate respective motor for each compression stage,
- at least one of the motors is cooled by a flow of cycle gas via at least one bypass pipe for a fraction of the flow of cycle gas supplying the compression mechanism, the bypass pipe comprising an upstream end attached to the outlet of at least one of the compression stages for drawing off a fraction of the flow of cycle gas,
- a downstream end of at least one bypass pipe is attached to the inlet of a compression stage after it passes and exchanges heat with at least one motor,
- the at least one bypass pipe comprises, between its upstream end and its downstream end, a subdivision into at least two separate branches respectively supplying separate motors in order to cool them,
- the at least two separate branches formed by the subdivision of a bypass pipe have a downstream junction within one and the same pipe portion,
- the at least one bypass pipe comprises at least one member for cooling the cycle gas,
- the at least one member for cooling the cycle gas of the at least one bypass pipe comprises a cooling heat exchanger.

In addition:
- the cycle gas may be made up of helium or a mixture comprising at least 50% helium,
- the cycle gas may be made up of hydrogen or a mixture comprising at least 50% hydrogen,
- the cycle gas may be made up of nitrogen or a mixture comprising at least 50% nitrogen,
- the compression mechanism may comprise solely compressors of centrifugal type,
- the fluid that is to be cooled may comprise at least one of the following: hydrogen, natural gas, biogas, methane, helium.

The invention also relates to a method for refrigeration or liquefaction of a fluid using a refrigeration device according to any one of the features above or below and including a step of circulating a fluid in the circuit for fluid that is to be cooled and a step of cooling said fluid via the cold produced by the refrigerator.

According to further possible particular features: the method includes a step of controlling the rotational speed of the compression stages in accordance with independent speeds, wherein, during at least one determined operating phase, the rotational speed of the compression stages in series that do not have a member for cooling the cycle gas such as a heat exchanger for exchanging heat between them is kept at a speed lower than the rotational speed of the compression stages that are provided at their outlet with a member for cooling the cycle gas.

The invention may also relate to any alternative device or method comprising any combination of the features above or below within the scope of the claims.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 is a schematic and partial depiction illustrating one example of the structure and operation of a device according to the invention.

DETAILED DESCRIPTION OF THE INVENTION

The device 1 is configured for the cryogenic refrigeration and/or liquefaction of a fluid (such as natural gas, biomethane or hydrogen, for example, but without this being limiting). The device 1 comprises a circuit 3 for fluid that is to be cooled/liquefied, having an upstream end intended to be connected to a source 2 of (gaseous, for example) fluid and a downstream end 23 intended to be connected to a member for collecting the cooled or liquefied fluid (a store, for example).

The device 1 comprises an assembly of heat exchanger(s) 6, 10 in a heat exchange relationship with the circuit 3 for fluid that is to be cooled.

The device 1 comprises a cold source having a refrigerator 20 in a heat exchange relationship with at least part of the assembly of heat exchanger(s) 6, 10.

The refrigerator 20 is cryogenic and of the type performing a refrigeration cycle on a cycle gas, predominantly comprising helium and/or hydrogen and/or nitrogen and/or neon.

For example, the cycle gas is made up of pure helium or a mixture comprising at least 50% helium.

Similarly, the cycle gas may be made up of pure hydrogen or a mixture comprising at least 50% hydrogen.

Similarly, the cycle gas may be made up of nitrogen or a mixture comprising at least 50% nitrogen.

As an alternative, the cycle gas may be made up of neon or a mixture comprising at least 50% neon.

Of course, any other suitable mixture or cycle gas can be envisaged, for example comprising at least one of the following: helium, hydrogen, nitrogen, neon, methane.

Typically, the refrigerator 20 comprises, disposed in series in a cycle circuit 14: a mechanism 15 for compressing the cycle gas, at least one member 7, 6, 10 for cooling the cycle gas, a mechanism 17 for expanding the cycle gas and at least one member 6, 10 for heating the expanded cycle gas.

The compression mechanism comprises multiple compression stages 15 in series composed of an assembly of compressor(s) of centrifugal type, the compression stages being mounted on an assembly of shafts driven in rotation by an assembly of motor(s) 18.

The at least one member for cooling the cycle gas comprises at least one heat exchanger 7 disposed at the outlet of at least one compression stage 15 in a heat exchange relationship with the cycle circuit 14. This at least one heat exchanger 7 can be cooled by a heat transfer fluid, for example water or air.

The assembly of heat exchanger(s) may comprise one or a plurality of heat exchangers 6, 10 disposed in series and in which two separate portions of the cycle circuit 14 exhibit circulation at the same time countercurrentwise for the cooling and the heating of the cycle gas, respectively.

The plurality of heat exchangers may thus form both a member for cooling the cycle gas and a member for heating the cycle gas.

According to an advantageous particular feature, the compression mechanism comprises at least two compression stages 15 which are disposed successively in series and do not have a member for cooling the cycle gas such as a heat exchanger 7 for exchanging heat between them. That is to say that two compression stages may follow one another without cooling taking place between the stages.

More specifically, at least one compression stage 15, at its outlet, does not have a cooling exchanger 7 cooled by a heat transfer fluid separate from the cycle gas (no "aftercooler"). Conversely, the cycle gas at the outlet of this compression stage may, where appropriate, directly enter a countercurrent cooling exchanger 6, 10 cooled by a flow colder than the cycle gas.

This can be advantageous for modifying, for example, an existing device of given capacity so as to increase its refrigeration power.

In the event of a relatively "heavy" cycle gas (that is to say, one which heats up significantly by centrifugal compression), such as that conventionally used (typically a mixture of helium and nitrogen), the prior art provides adding an additional cooling exchanger ("intercooler") in order that the cycle gas is not too hot when it enters the subsequent compression stage. This is done in a way so as not to reach excessively high temperatures.

For lighter gases, such as helium or hydrogen, use is conventionally made of positive-displacement compressors in which a single compression stage is followed by a cooling exchanger.

The invention goes against prejudices since the overall compression efficiency can drop in relation to the known systems (since the last compression stage works at a higher temperature). However, notably in the case of very light cycle gases (molar mass less than 30 g/mol and notably less than 20 g/mol or less than 10 g/mol), the drop in performance of the less isothermic compression according to the invention is more than compensated by the reduction in pressure drops (on account of the lower number of cooling exchangers).

In addition, the saving on hardware is significant (cooling exchanger(s) and associated circuitry in particular).

This is particularly advantageous in the case of adding a downstream compressor to an existing device (a single added item of equipment, a module: compressor+motor) which may be identical to the previous compression module. This does not require any, or requires very few, modifications to the design.

The last added compression stage without cooling at the outlet can be easily integrated. The advantage is better competitiveness of the new system and a certain amount of versatility via adding an additional compression stage on site at lower cost, notably if there is a desire to increase the production of a plant after several years of operation.

In the nonlimiting example illustrated, the compression mechanism comprises four compression stages (wheels) 15 in series and cooling means 7 solely at the outlet of three of these four compression stages, preferably at the outlet of the first, second and fourth compression stages. That is to say that the cycle gas is not cooled between the third and fourth compression stages.

As a result, the device retains a temperature increase owing to the (relatively) low centrifugal compression in order to not need an intercooler between each compression stage. This makes it possible to decrease the cost and increase compactness whilst still limiting the impact on the overall efficiency of the compression system.

Of course, any other configuration is possible in terms of the number of compression stages and of the one or more stages that do not have cooling at the outlet, for example it is possible to envisage an architecture with a cooling heat exchanger 7 disposed solely every two compression stages 15 in series (or every three compression stages in series). In other possible configurations, for example a device with three compression stages in series, of which the two first stages are provided at their outlet with a cooling heat exchanger, at the outlet of the third compression stage the cycle gas may then directly enter a countercurrent exchanger of the refrigeration device and then subsequently enter an expansion stage (for example a single turbine). At the outlet of the expansion stage, the cycle gas may then be placed in a heat exchange relationship with the circuit for gas that is to be cooled (typically in a heat exchanger). Then, after this exchange with the fluid that is to be cooled, the cycle gas can pass into a countercurrent exchanger in which it heats up by cooling the flow leaving the aforementioned compression stage. This heated cycle gas may then re-enter the first compression stage to restart a cycle.

With preference, the assembly of motor(s) 18 comprises multiple motors for driving the compression stages.

In the example illustrated, a respective motor 18 is provided for each compression stage. Of course, a motor 18 could drive multiple compression stages (mounted on one and the same output shaft, for example). Similarly, one or more turbines 17 could be mounted on the shaft of a motor 18 which drives one or more compression stage(s).

At least one of the motors 18 may be cooled by a flow of cycle gas.

As illustrated, at least one bypass pipe 4, 5, 9 may be provided to draw off a fraction of the flow of cycle gas supplying the compression mechanism. The bypass pipe 4 may comprise an upstream end attached to the outlet of at least one of the compression stages 15 (for example downstream of the first compression stage 15, notably after cooling 7) to draw off a fraction of the flow of cycle gas.

The downstream end of the bypass pipe may be attached to the inlet of another compression stage after it passes and exchanges heat with at least one motor 18 (for example upstream of the first compression stage 15 in this example).

The at least one bypass pipe 4 may comprise, between its upstream end and its downstream end, at least one subdivision into at least two separate branches 5, 9 respectively supplying separate motors 18 in order to cool them. That is to say that a cooling circuit can thus be provided to cool all or some of the motors 18.

As a result, all or some of the motors 18 can be cooled by the cycle gas tapped off at different pressure levels from the circuit.

As illustrated, the at least two separate branches 5, 9 formed by the subdivision of a bypass pipe 4 may have a downstream junction within one and the same pipe portion.

The at least one bypass pipe may comprise at least one member 8 for cooling the cycle gas, for example at least one cooling heat exchanger 8 for cooling the flow after heat exchange with at least one motor 18.

Advantageously, the rotational speed of the (two) last compression stages (compression wheels) may be reduced in relation to the other stages in order to limit their compression rate and the heating of the cycle fluid. This makes it possible to avoid reaching excessively high temperatures that are liable to damage the equipment.

This invention is particularly suitable for refrigerators of which the cycle gas is a light gas, that is to say having a molar mass comprised between 2 and 30 g/mol and preferably between 2 and 20 g/mol. This is because, in this case, the drop in compression performance resulting from the absence of cooling between compression stages is largely compensated by the structural benefit, the decrease in cost and by ease of implementation.

Of course, the invention can be used with a heavier cycle gas (in this case, the compression rates of each compression stage are preferably reduced so as to limit the heating, but whilst still remaining greater than that which would be obtained with helium and/or h2 alone).

As illustrated, the system for cooling the cycle gas may comprise a heat exchanger, disposed at the outlet of at least some of the turbines 17 except for the last turbine 17 in series along the direction of circulation of the cycle gas.

The device 1 may have more compression stages 15 than it does turbines 17.

The device 1 may have a number of compression stages equal to three, four, five or more.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for refrigeration or liquefaction of a fluid, the device comprising:
   a circuit for fluid that is to be cooled, having an upstream end intended to be connected to a source of gaseous fluid and a downstream end intended to be connected to a member for collecting the cooled or liquefied fluid;
   an assembly of heat exchanger(s) in a heat exchange relationship with the circuit for fluid that is to be cooled;
   a refrigerator in a heat exchange relationship with at least part of the assembly of heat exchanger(s), the refrigerator configured to perform a refrigeration cycle on a cycle gas, the cycle gas selected from the group consisting of: helium, hydrogen, nitrogen, neon, and combinations thereof,
   said refrigerator comprising the following, disposed in series in a cycle circuit:
      a compression mechanism configured to compress the cycle gas,
      at least one cooling member configured to cool the cycle gas,
      an expanding mechanism configured to expand the cycle gas, and
      at least one heating member configured to heat the expanded cycle gas,
   wherein the compression mechanism comprises multiple compression stages in series that are composed of an assembly of compressor(s) of centrifugal type,
   wherein the compression stages are mounted on a set of shafts driven in rotation by an assembly of motor(s),
   wherein the at least one cooling member comprises at least one heat exchanger disposed at the outlet of at least one compression stage in a heat exchange relationship with the cycle circuit,
   wherein said heat exchanger is cooled by a heat transfer fluid,
   wherein the compression mechanism comprises at least two compression stages that are disposed successively in series and do not have a member for cooling the cycle gas such as a heat exchanger for exchanging heat between them,
   wherein the assembly of motor(s) comprises multiple motors for driving the compression stages,
   wherein at least one of the motors is cooled by a flow of cycle gas via at least one bypass pipe for a fraction of the flow of cycle gas supplying the compression mechanism, and
   wherein the bypass pipe comprises an upstream end attached to the outlet of at least one of the compression stages for drawing off a fraction of the flow of cycle gas.

2. The device as claimed in claim 1, wherein the fluid is selected from the group consisting of natural gas and hydrogen.

3. The device as claimed in claim 1, wherein the compression mechanism comprises four compression stages in series, the member for cooling the cycle gas comprising three cooling heat exchangers that are disposed respectively at the outlet of three of these four compression stages, for example between the first and the second compression stage, between the second and the third compression stage, and at the outlet of the fourth compression stage.

4. The device as claimed in claim 1, further comprising cooling heat exchangers disposed solely every two compression stages in series.

5. The device as claimed in claim 1, wherein the assembly of motor(s) comprises a separate respective motor for each compression stage.

6. The device as claimed in claim 1, wherein a downstream end of at least one bypass pipe is attached to the inlet of a compression stage after it passes and exchanges heat with at least one motor.

7. The device as claimed in claim 6, wherein the at least one bypass pipe comprises, between its upstream end and its downstream end, a subdivision into at least two separate branches respectively supplying separate motors in order to cool them.

8. The device as claimed in claim 7, wherein the at least two separate branches formed by the subdivision of a bypass pipe have a downstream junction within one and the same pipe portion.

9. The device as claimed in claim 1, wherein the at least one bypass pipe comprises at least one member for cooling the cycle gas.

10. The device as claimed in claim 9, wherein the at least one member for cooling the cycle gas of the at least one bypass pipe comprises a cooling heat exchanger.

11. A method for refrigeration or liquefaction of a fluid using a refrigeration device as claimed in claim 1, wherein said method includes the steps of: circulating a fluid in the circuit for fluid that is to be cooled; and cooling said fluid via the cold produced by the refrigerator.

12. The method as claimed in claim 11, further comprising the step of controlling the rotational speed of the compression stages in accordance with independent speeds, wherein, during at least one determined operating phase, the rotational speed of the compression stages in series that do not have a member for cooling the cycle gas such as a heat exchanger for exchanging heat between them is kept at a speed lower than the rotational speed of the compression stages that are provided at their outlet with a member for cooling the cycle gas.

13. The method as claimed in claim 11, wherein the fluid is selected from the group consisting of natural gas and hydrogen.

* * * * *